(12) United States Patent
Francis et al.

(10) Patent No.: US 9,914,113 B2
(45) Date of Patent: Mar. 13, 2018

(54) HYDROCRACKING PROCESS USING A ZEOLITE CATALYST CONTAINING TWO DISTINCT HYDROGENATING FUNCTIONS

(75) Inventors: Jeremy Francis, Lyons (FR); Laurent Simon, Villeurbanne (FR); Emmanuelle Guillon, Vourles (FR); Nicolas Bats, Saint Symphorien d'Ozon (FR); Avelino Corma, Valence (ES); Christophe Pichon, Lyons (FR)

(73) Assignee: IFP ENERGIES NOUVELLES, Rueil-Malmaison (FR)

( * ) Notice: Subject to any disclaimer, the term of this patent is extended or adjusted under 35 U.S.C. 154(b) by 1579 days.

(21) Appl. No.: 13/345,041

(22) Filed: Jan. 6, 2012

(65) Prior Publication Data
US 2012/0205286 A1 Aug. 16, 2012

(30) Foreign Application Priority Data
Jan. 7, 2011 (FR) .................................... 11 00043

(51) Int. Cl.
| | | |
|---|---|---|
| C10G 45/12 | (2006.01) | |
| C10G 47/06 | (2006.01) | |
| C10G 65/12 | (2006.01) | |
| B01J 29/04 | (2006.01) | |
| B01J 29/14 | (2006.01) | |
| B01J 29/16 | (2006.01) | |
| B01J 35/00 | (2006.01) | |
| B01J 35/10 | (2006.01) | |
| B01J 37/00 | (2006.01) | |
| B01J 37/02 | (2006.01) | |
| B01J 37/20 | (2006.01) | |
| C10G 49/08 | (2006.01) | |

(52) U.S. Cl.
CPC .......... *B01J 29/146* (2013.01); *B01J 29/166* (2013.01); *B01J 35/002* (2013.01); *B01J 35/0066* (2013.01); *B01J 35/109* (2013.01); *B01J 37/0009* (2013.01); *B01J 37/0205* (2013.01); *B01J 37/20* (2013.01); *C10G 49/08* (2013.01); *B01J 2229/14* (2013.01); *B01J 2229/16* (2013.01); *B01J 2229/186* (2013.01); *B01J 2229/20* (2013.01); *B01J 2229/36* (2013.01); *B01J 2229/37* (2013.01); *B01J 2229/38* (2013.01); *B01J 2229/42* (2013.01); *C10G 2300/301* (2013.01); *C10G 2300/4018* (2013.01)

(58) Field of Classification Search
CPC ........ C10G 45/12; C10G 47/06; C10G 65/12; B01J 29/04
See application file for complete search history.

(56) References Cited

U.S. PATENT DOCUMENTS

| | | | |
|---|---|---|---|
| 3,536,605 A | 10/1970 | Kittrell | |
| 5,954,946 A | 9/1999 | Klazinga et al. | |
| 2007/0102321 A1 | 5/2007 | Wang | |
| 2011/0108459 A1* | 5/2011 | Simon et al. | 502/74 |
| 2011/0108460 A1* | 5/2011 | Simon et al. | 208/100 |

FOREIGN PATENT DOCUMENTS

DE 38 18 294 A1 12/1988

OTHER PUBLICATIONS

Search Report of FR 1100043 (dated Aug. 17, 2011).
D.S. Liu et al., "Structural Evolution of Dealuminated Y Zeolites During KOH solution Treatment", Zeolites, vol. 18, (1997) pp. 162-170.
S. Nuntang et al., "COmparative Study on Adsorptive Removal of Thiophenic Sulfurs Over Y and USY Zeolites", vol. 47, No. 19 (2008) pp. 7405-7413.
G. Niu et al., "NO Adsorption Study on the Distribution of Nickel Ions on the Mixed Carriers of USY Zeolite and y-$Al_2O_3$", Applied Surface Science, vol. 141, No. 1-2 (1999) pp. 35-42.
Machine Translation of DE 3818294; dated Dec. 22, 1988.

* cited by examiner

*Primary Examiner* — Randy Boyer
(74) *Attorney, Agent, or Firm* — Millen, White, Zelano & Branigan

(57) ABSTRACT

Process for hydrocracking and/or hydrotreatment of hydrocarbon feeds utilizing a catalyst comprising at least one hydro-dehydrogenating element of group VIB and of non-precious group VIII used alone or mixed, and a support comprising at least one porous mineral matrix and at least one dealuminated USY zeolite having an overall silicon-to-aluminium atomic ratio comprised between 2.5 and 10, a fraction by weight of extra-network aluminium atom greater than 10% relative to the total mass of the aluminium present in the zeolite, a mesopore volume measured by nitrogen porosimetry greater than 0.07 ml.$g^{-1}$, and a crystal parameter $a_0$ of the elemental mesh greater than 24.28 Å, in which a quantity of the element nickel comprised between 0.5 and 3% by weight relative to the total mass of the zeolite is deposited on said USY zeolite and in which said catalyst is in the sulphide form.

14 Claims, No Drawings

HYDROCRACKING PROCESS USING A ZEOLITE CATALYST CONTAINING TWO DISTINCT HYDROGENATING FUNCTIONS

TECHNICAL FIELD

The present invention relates to a hydroconversion process and in particular a hydrocracking and/or hydrotreatment process utilizing a zeolite catalyst comprising at least one porous mineral matrix and at least one dealuminated Y zeolite (USY) having particular textural characteristics, said catalyst comprising two distinct hydrogenating active phases. Said dealuminated Y zeolite (USY) having particular textural characteristics comprises in its porous network a first hydrogenating active phase constituted by a quantity of nickel comprised between 0.5 and 3% by weight relative to the total mass of the zeolite. Moreover, said catalyst also has a second hydrogenating active phase deposited on the support or contained in the porous mineral matrix, constituting the support. The second hydrogenating active phase comprises at least one hydro-dehydrogenating element selected from the group comprising elements of group VIB and of non-precious group VIII of the periodic table, used alone or mixed.

In particular, the invention relates to a process for hydrocracking and/or hydrotreatment of hydrocarbon feeds utilizing a catalyst comprising at least one hydro-dehydrogenating element selected from the group comprising elements of group VIB and of non-precious group VIII of the periodic table, used alone or mixed, and a support comprising at least one porous mineral matrix and at least one dealuminated Y zeolite, USY, having an overall silicon-to-aluminium atomic ratio comprised between 2.5 and 10, a fraction by weight of extra-network aluminium atom greater than 10% relative to the total mass of the aluminium present in the zeolite, a mesopore volume measured by nitrogen porosimetry greater than $0.07$ $ml.g^{-1}$, and a crystal parameter $a_0$ of the elemental mesh greater than 24.28 Å, in which a quantity of the element nickel comprised between 0.5 and 3% by weight relative to the total mass of the zeolite is deposited on said USY zeolite and in which said catalyst is in the sulphide form.

The invention relates to the hydrocracking and/or hydrotreatment of hydrocarbon feeds containing for example aromatic, and/or olefinic, and/or naphthenic, and/or paraffinic compounds excluding feeds resulting from the Fischer-Tropsch process and optionally containing metals, and/or nitrogen, and/or oxygen and/or sulphur.

The present invention therefore relates to a hydroconversion process and in particular a hydrocracking and/or hydrotreatment process utilizing a zeolite catalyst comprising at least one porous mineral matrix and at least one dealuminated Y zeolite (USY) having particular textural characteristics, said catalyst comprising two distinct hydrogenating active phases.

The objective of the hydrocracking process according to the invention is essentially the production of middle distillates, i.e. of a kerosene cut having a boiling point comprised between 150 and 250° C., and of a gas oil cut having a boiling point comprised between 250 and 380° C.

PRIOR ART

The hydrocracking of heavy petroleum cuts is a very important refining process which makes it possible to produce, from surplus and low-value heavy feeds, lighter fractions such as gasolines, jet fuels and light gas oils sought by the refiner in order to adapt his production to the structure of the demand. Certain hydrocracking processes make it possible to also obtain a highly purified residue which can provide excellent bases for oils. Compared with catalytic cracking, the benefit of catalytic hydrocracking is to provide middle distillates of very good quality. Conversely, the gasoline produced has an octane number much lower than that resulting from catalytic cracking.

Hydrocracking is a process which derives its flexibility from three main elements, which are the operating conditions used, the types of catalysts used and the fact that the hydrocracking of hydrocarbon feeds can be carried out in one or two stages.

The hydrocracking catalysts used in the hydrocracking processes are all of the bi-functional type combining an acid function with a hydrogenating function. The acid function is provided by acid supports the surface areas of which generally vary from 150 to 800 $m^2.g^{-1}$ such as the halogenated aluminas (chlorinated or fluorinated in particular), the combinations of boron and aluminium oxides, and more often the amorphous silica-aluminas and the zeolites in combination with a binder, generally aluminium. The hydrogenating function is provided either by one or more metals of group VIB of the periodic table of the elements, or by a combination of at least one metal of group VIB of the periodic table and at least one metal of group VIII deposited on the support.

The bi-functionality of the catalyst, i.e. the relationship, the force and the distance between the acid and hydrogenating functions is a key parameter known to a person skilled in the art to influence the activity and the selectivity of the catalyst. A weak acid function and a strong hydrogenating function produce low-activity catalysts, working at a generally high temperature (above or equal to 390-400° C.), and at a low feed space velocity (the HSV expressed in volume of feed to be treated per volume unit of catalyst and per hour is generally less than or equal to 2), but provided with a very good middle-distillates selectivity (kerosene and gas oils). Conversely, a strong acid function and a weak hydrogenating function produce active catalysts, but having less good middle-distillates selectivities.

A type of conventional hydrocracking catalyst is based on moderately acid amorphous supports, such as the silica-aluminas for example. These systems are used to produce middle distillates of good quality and, optionally, oil bases. These catalysts are for example used in one-step processes. The drawback of these catalysts based on amorphous support is their weak activity.

Catalysts comprising for example Y zeolite of FAU structural type for their part have a catalytic activity greater than that of the silica-aluminas, but have weaker middle-distillates selectivities (kerosenes and gas oils). This difference is attributed to the difference in force of the acid sites on the two types of materials.

The prior art reports numerous works aimed at improving the middle-distillates selectivity of the zeolite catalysts. The latter are compounds with a hydrogenating phase of very variable composition, i.e. which may contain different metals, said hydrogenating phase being deposited on the zeolite support generally constituted by a Y zeolite and a binder. Such a catalyst is then sulphurized in order to be active in the hydrocracking reactions.

For example, there may be mentioned works relating to the different treatments to which the Y zeolite can be subjected, such as dealumination by steam treatment or acid attack of the Y zeolite, for example, according to the teaching of U.S. Pat. No. 7,192,900 or also works relating to the addition of promoter according to the teaching of U.S. Pat. No. 6,524,470 or the use of small crystals of Y zeolites according to the teaching of U.S. Pat. No. 5,401,704.

Few works have been devoted to studying the nature of the metallic phase within the catalyst. The quantities of metals utilized in the hydrocracking catalysts are generally high and often greater than 15% by weight relative to the total mass of the catalyst. The metals are generally dispersed over the binder, which is preferably amorphous, of the support, said support being constituted by the binder and the zeolite.

The Applicant's research works have thus led to the discovery that the use of a dealuminated USY zeolite having very particular textural characteristics and the fact of depositing on said zeolite a specific hydrogenating phase constituted by nickel which thus reinforces the hydro-dehydrogenating phase deposited on the matrix, made it possible to obtain an improved middle-distillates yield while maintaining a comparable activity. The hydrogenating function deposited on said dealuminated USY zeolite having very particular textural characteristics is ensured by the metallic element nickel which is deposited on said zeolite in a quantity comprised between 0.5 and 3% by weight of nickel metal relative to the total mass of the zeolite.

An objective of the present invention is therefore to provide a process for hydrocracking and/or hydrotreatment of hydrocarbon feeds making it possible to obtain an improved iso-conversion middle-distillates yield compared with catalysts of the prior art and utilizing a zeolite catalyst using a dealuminated USY zeolite having very particular textural characteristics, said catalyst comprising two distinct hydrogenating phases one of which is deposited on the zeolite.

More precisely, the invention relates to a process for hydrocracking and/or hydrotreatment of hydrocarbon feeds utilizing a catalyst comprising at least one hydro-dehydrogenating element selected from the group comprising elements of group VIB and of non-precious group VIII of the periodic table, used alone or mixed, and a support comprising at least one porous mineral matrix and at least one dealuminated USY zeolite having an overall silicon-to-aluminium atomic ratio comprised between 2.5 and 10, a fraction by weight of extra-network aluminium atom greater than 10% relative to the total mass of the aluminium present in the zeolite, a mesopore volume measured by nitrogen porosimetry greater than 0.07 ml.g$^{-1}$, and a crystal parameter $a_0$ of the elemental mesh greater than 24.28 Å, in which a quantity of the element nickel comprised between 0.5 and 3% by weight relative to the total mass of the zeolite is deposited on said USY zeolite and in which said catalyst is in the sulphide form. An advantage of the present invention resides in the obtaining of a very high activity of hydrocracking of the hydrocarbon cuts and an improvement in the middle-distillates yield as well as a greater middle-distillates selectivity than the catalytic formulae known in the prior art.

Without wishing to be bound by any theory, it seems that this particularly high activity obtained at the end of the process according to the present invention is due both to the use of a dealuminated USY zeolite having very particular textural characteristics, in particular an overall silicon-to-aluminium atomic ratio comprised between 2.5 and 10, and to the joint presence of a hydrogenating function deposited on the matrix and of a hydrogenating function constituted by nickel deposited on said zeolite, in particular a quantity of the element nickel comprised between 0.5 and 3% by weight relative to the total mass of the zeolite.

DESCRIPTION OF THE INVENTION

According to the invention, the process for hydrocracking and/or hydrotreatment of hydrocarbon feeds utilizes a catalyst comprising at least one hydro-dehydrogenating element selected from the group comprising elements of group VIB and of non-precious group VIII of the periodic table, used alone or mixed, and a support comprising at least one porous mineral matrix and at least one dealuminated Y zeolite, USY, having an overall silicon-to-aluminium atomic ratio comprised between 2.5 and 10, a fraction by weight of extra-network aluminium atom greater than 10% relative to the total mass of the aluminium present in the zeolite, a mesopore volume measured by nitrogen porosimetry greater than 0.07 ml.g$^{-1}$, and a crystal parameter $a_0$ of the elemental mesh greater than 24.28 Å, in which a quantity of the element nickel comprised between 0.5 and 3% by weight relative to the total mass of the zeolite is deposited on said USY zeolite and in which said catalyst is in the sulphide form.

Throughout the remainder of the text, by mesopore volume is meant the volume of the pores the diameter of which is comprised between 2 and 50 nm. By micropore volume is also meant the volume of the pores the diameter of which is less than 2 nm. The micropore and mesopore volumes of the dealuminated USY zeolite used in the catalyst support utilized in the process according to the invention are measured by nitrogen adsorption/desorption. The measurement method will be explained below.

Similarly, throughout the remainder of the text, the catalyst support utilized in the process according to the invention comprises and is preferably constituted by at least one porous mineral matrix and at least one dealuminated USY zeolite having the particular textural characteristics defined above, a quantity of the element nickel comprised between 0.5 and 3% by weight relative to the total mass of the zeolite being deposited on said USY zeolite.

Preferably, said support comprises and is preferably constituted by:
  0.1 to 80% by weight, preferably 0.1 to 70% by weight, and in preferred manner 0.1 to 50% by weight relative to the total mass of said support, of a dealuminated USY having the particular textural characteristics defined above, a quantity of the element nickel comprised between 0.5 and 3% by weight relative to the total mass of the zeolite being deposited on said USY zeolite.
  and 20 to 99.9%, preferably 30 to 99.9% by weight, and in preferred manner 50 to 99.9% by weight relative to the total mass of the catalyst, of at least one porous mineral matrix.

The porous mineral matrix used in the catalyst support utilized in the process according to the invention is advantageously constituted by at least one refractory oxide, preferably selected from the group comprising alumina, silica, silica-alumina, clay, titanium oxide, boron oxide and zirconium, used alone or mixed. In preferred manner, the porous mineral matrix is selected from alumina and silica-alumina used alone or mixed. In more preferred manner, the porous mineral matrix is alumina. The alumina can advantageously be present in all its forms known to a person skilled in the art. In very preferred manner, the alumina is gamma alumina.

According to the invention, the dealuminated USY zeolite used in the catalyst support utilized in the process according to the invention has an overall silicon-to-aluminium atomic ratio comprised between 2.5 and 10, preferably comprised between 3 and 10 and in preferred manner comprised between 3 and 8, a fraction by weight of initial extra-network aluminium atom greater than 10% relative to the total mass of the aluminium present in the zeolite, preferably greater than 15% and in preferred manner greater than 20%, an initial mesopore volume measured by nitrogen porosimetry greater than 0.07 ml.g$^{-1}$, preferably greater than 0.10 ml.g$^{-1}$ and in preferred manner greater than 0.14 ml.g$^{-1}$ and an initial crystal parameter $a_0$ of the elemental mesh greater than 24.28 Å, preferably greater than 24.29 Å and in preferred manner greater than 24.30 Å.

Preferably, said dealuminated USY zeolite used in the catalyst support utilized in the process according to the invention also has a micropore volume measured by nitrogen porosimetry greater than 0.20 ml.g$^{-1}$, and preferably greater than 0.23 ml.g$^{-1}$.

Obtaining Said Dealuminated USY Zeolite.

The dealuminated USY zeolite having the particular textural characteristics defined above and suitable for the utilization in the catalyst support used in the process according to the invention is advantageously prepared from a Y zeolite of FAU structural type preferably having an overall Si/Al atomic ratio after synthesis comprised between 2.3 and 2.8 and advantageously being present in the NaY form after synthesis. Said Y zeolite of FAU structural type is advantageously subjected to one or more ion exchanges before being subjected to the dealumination stage.

The dealumination treatment of said Y zeolite of FAU structural type can advantageously be carried out by all the methods known to a person skilled in the art. In preferred manner, the dealumination is carried out by a heat treatment in the presence of steam (or steaming) and/or by one or more acid attacks advantageously carried out by treatment with an aqueous solution of mineral or organic acid.

Preferably, the dealumination is carried out by a heat treatment followed by one or more acid attacks or by one or more acid attacks only.

Preferably, the heat treatment in the presence of steam to which said Y zeolite is subjected is carried out at a temperature comprised between 200 and 900° C., preferably between 300 and 900° C., in even more preferred manner between 400 and 750° C. The duration of said heat treatment is advantageously greater than or equal to 0.5 h, preferably comprised between 0.5 h and 24 h, and in very preferred manner comprised between 1 h and 12 h. The percentage by volume of steam during the heat treatment is advantageously comprised between 5 and 100%, preferably between 20 and 100%, in preferred manner between 40% and 100%. The fraction by volume other than the steam optionally present is formed by air. The flow-rate of gas formed by steam and optionally by air is advantageously comprised between 0.2 L.h$^{-1}$.g$^{-1}$ and 10 L.h$^{-1}$.g$^{-1}$ of the Y zeolite.

The heat treatment makes it possible to extract the aluminium atoms from the framework of the Y zeolite while keeping the overall Si/Al atomic ratio of the treated zeolite unchanged.

The heat treatment in the presence of steam is advantageously repeated as many times as necessary to obtain the dealuminated USY zeolite suitable for the utilization in the catalyst support used in the process according to the invention possessing the desired textural characteristics and in particular a fraction by weight of extra-network aluminium atom greater than 10% by weight relative to the total mass of aluminium present in said zeolite. The number of heat treatments is advantageously less than 4. Preferably, a single heat treatment is carried out, at the end of which the fraction by weight of extra-network aluminium atom is measured by NMR of the aluminium.

In order to carry out a dealumination of said Y zeolite and to adjust the overall Si/Al atomic ratio of the dealuminated Y zeolite to a value comprised between 3 and 10 according to the invention, it is necessary to carefully select and control the operating conditions of each stage of acid attack. In particular, the temperature at which the treatment with the aqueous solution of mineral or organic acid is carried out, the nature and the concentration of the acid used, the ratio between the quantity of acid solution and the weight of treated zeolite, the duration of the acid attack treatment and the number of treatments carried out are significant parameters for the implementation of each stage of acid attack.

The acid selected for the implementation of said stage of acid attack is advantageously either a mineral acid or an organic acid, preferably the acid is a mineral acid selected from nitric acid $HNO_3$, hydrochloric acid HCl and sulphuric acid $H_2SO_4$. In very preferred manner, the acid used is nitric acid. When an organic acid is used for the acid attack, acetic acid $CH_3CO_2H$ is preferred.

Preferably, the acid attack treatment of said Y zeolite with an aqueous solution of a mineral acid or of an organic acid is carried out at a temperature comprised between 30° C. and 120° C., preferably between 50° C. and 120° C., and in preferred manner between 60 and 100° C. The concentration of the acid in the aqueous solution is advantageously comprised between 0.05 and 20 mol.L$^{-1}$, preferably between 0.1 and 10 mol.L$^{-1}$, and in more preferred manner between 0.5 and 5 mol.L$^{-1}$. The ratio between the volume of acid solution V in ml and the weight of treated Y zeolite P in grams is advantageously comprised between 1 and 50, and preferably between 2 and 20. The duration of the acid attack is advantageously greater than 1 h, preferably comprised between 2 h and 10 h, and in preferred manner between 2 h and 8 h. The number of successive acid attack treatments of said Y zeolite with an aqueous acid solution is advantageously less than 4. In the case where several successive acid attack treatments are carried out, aqueous solutions of mineral or organic acid of different acid concentrations can be used.

In order to adjust the overall Si/Al atomic ratio of the dealuminated USY zeolite to a value comprised between 3 and 10, said ratio is measured by X-ray fluorescence at the end of each acid attack treatment carried out.

After carrying out the acid attack treatment(s), said zeolite obtained is then advantageously washed with distilled water then dried at a temperature comprised between 80 and 140° C. for a duration comprised between 10 and 48 h.

The obtained dealuminated USY zeolite suitable for the utilization in the catalyst support used in the process according to the invention is optionally subjected to a desilication stage. In said desilication stage, some of the silicon atoms contained in the framework of said zeolite are extracted, creating spaces in the structure and the formation of a mesoporosity and/or allowing the reinsertion of at least part of the fraction of the extra-network aluminium atoms present in said dealuminated USY zeolite, in the place of said silicon atoms. This thus allows the formation of new Brønsted acid sites. This second phenomenon is called re-alumination.

The optional desilication stage consists of the process of modification of said dealuminated USY zeolite described below.

The dealuminated USY zeolite is therefore advantageously modified by a specific modification process comprising a) a stage of basic treatment consisting of mixing said dealuminated Y zeolite with a basic aqueous solution, said basic aqueous solution being a solution of basic compounds selected from the alkaline bases and the strong non-alkaline bases, said stage a) being carried out at a temperature comprised between 40 and 100° C. and for a duration comprised between 5 minutes and 5 h and at least one heat treatment stage c) carried out at a temperature comprised between 200 and 700° C.

The stage a) of basic treatment makes it possible to remove silicon atoms from the structure and insert extra-network aluminium atoms into the framework.

Said process of modification of said dealuminated USY zeolite comprises a stage a) of basic treatment consisting of mixing said dealuminated USY zeolite with a basic aqueous solution, said basic aqueous solution being a solution of basic compounds selected from the alkaline bases and the strong non-alkaline bases, said stage a) being carried out at a temperature comprised between 40 and 100° C. and for a duration comprised between 5 minutes and 5 h.

The basic compounds selected from the alkaline bases are preferably selected from the alkaline carbonates and the alkaline hydroxides, the alkaline cations of the alkaline carbonates and of the alkaline hydroxides advantageously belonging to groups IA or IIA of the periodic table and the strong non-alkaline bases are preferably selected from the quaternary ammoniums used alone or mixed and in preferred manner the strong non-alkaline base is tetramethylammonium hydroxide.

Said alkaline cations of the alkaline carbonates and of the alkaline hydroxides advantageously belonging to groups IA or IIA of the periodic table are preferably selected from the Na+, Li+, K+, Rb+, Cs+, Ba2+ and Ca2+ cations and, in very preferred manner, said cation is the Na+ or K+ cation.

Preferably, the aqueous solution is a solution of sodium carbonate or of sodium hydroxide and, in preferred manner, the aqueous solution is a solution of sodium hydroxide.

Said basic aqueous solution with a concentration comprised between 0.001 mol.L$^{-1}$ and 12 mol.L$^{-1}$, in preferred manner with a concentration between 0.005 mol.L$^{-1}$ and 11 mol.L$^{-1}$ and in even more preferred manner with a concentration between 0.01 mol.L$^{-1}$ and 9 mol.L$^{-1}$.

The basic treatment stage a) of the process of modification of said dealuminated USY zeolite is carried out under temperature conditions comprised between 40 and 100° C. (reflux) and in preferred manner between 40 and 90° C. and for a duration comprised between 5 min and 5 h, in preferred manner between 15 min and 4 h and in even more preferred manner between 15 min and 3 h.

Once the basic treatment of said zeolite is completed, the solution is cooled down rapidly to ambient temperature then said zeolite is separated from the liquid by any technique known to a person skilled in the art. The separation can be carried out by filtration or by centrifugation, and in preferred manner by centrifugation. The modified USY zeolite obtained is then washed with distilled water at a temperature comprised between 20 and 100° C. and preferably at a temperature comprised between 40 and 80° C. and in very preferred manner at 50° C. and dried at a temperature comprised between 80 and 150° C. and preferably between 100 and 130° C. and in very preferred manner at 120° C.

In the case where the basic treatment stage a) consists of mixing said dealuminated USY zeolite with a basic aqueous solution of compounds selected from the alkaline bases, the zeolite contained in the catalyst support used in the process according to the invention contains, at the end of stage a) of the modification process, a partial or total fraction of alkaline ions in the cationic position.

In the case where the basic treatment stage a) consists of mixing said dealuminated USY zeolite with a basic aqueous solution of compounds selected from the non-alkaline bases, the zeolite contained in the catalyst support used in the process according to the invention contains, at the end of stage a) of the modification process, a partial or total fraction of quaternary ammonium ions in the cationic position.

During the basic treatment stage a) of the process of modification of the dealuminated USY zeolite, some of the silicon atoms contained in the framework of said zeolite are extracted, the phenomenon is called desilication, creating spaces in the structure and the formation of a mesoporosity and/or allowing the reinsertion of at least part of the fraction of the extra-network aluminium atoms present in said dealuminated initial Y zeolite, in the place of the silicon atoms extracted by desilication and thus allowing the formation of new Brønsted acid sites. This second phenomenon is called re-alumination.

In the case where the basic treatment stage a) consists of mixing said dealuminated USY zeolite with a basic aqueous solution of basic compounds selected from the alkaline bases and preferably selected from the alkaline carbonates and the alkaline hydroxides and in very preferred manner with a solution of sodium hydroxide (NaOH), the process of modification of said initial dealuminated USY zeolite advantageously comprises a stage b) of at least one partial or total exchange of said alkaline cations belonging to groups IA and IIA of the periodic table, introduced during stage a) and present in the cationic position, with $NH_4^+$ cations and preferably of the Na+ cations with $NH_4^+$ cations.

By partial or total exchange of the alkaline cations with $NH_4^+$ cations is meant the exchange of 80 to 100%, in preferred manner of 85 to 99.5% and in more preferred manner of 88 and 99%, of said alkaline cations with $NH_4^+$ cations. The quantity of alkaline cations remaining and, preferably, the quantity of $Na^+$ cations remaining in the modified zeolite, relative to the quantity of $NH_4^+$ cations initially present in the zeolite, at the end of stage b) is advantageously comprised between 0 and 20%, preferably between 0.5 and 15%, in preferred manner between 1 and 12%.

Preferably, for this stage, several ion exchange(s) are carried out with a solution containing at least one ammonium salt selected from ammonium chlorate, sulphate, nitrate, phosphate, or acetate salts, so as to at least partly remove the alkaline cations and preferably the $Na^+$ cations present in the zeolite. Preferably, the ammonium salt is ammonium nitrate $NH_4NO_3$.

Thus, the content of alkaline cations and preferably of Na+ cations remaining in the modified zeolite at the end of stage b) is preferably such that the alkaline cation/aluminium molar ratio, and preferably the Na/Al molar ratio, is comprised between 0.2:1 and 0:1, preferably comprised between 0.15:1 and 0.005:1, and in more preferred manner comprised between 0.12:1 and 0.01:1.

The desired Na/Al ratio is obtained by adjusting the $NH_4^+$ concentration of the cation exchange solution, the temperature of the cation exchange and the number of cation exchanges. The concentration of $NH_4^+$ in the solution varies advantageously between 0.01 and 12 mol.L$^{-1}$, and preferably between 1 and 10 mol.L$^{-1}$. The temperature of the exchange stage is advantageously comprised between 20 and 100° C., preferably between 60 and 95° C., in preferred manner between 60 and 90° C., in more preferred manner between 60 and 85° C. and in even more preferred manner between 60 and 80° C. The number of cation exchanges varies advantageously between 1 and 10 and preferably between 1 and 4.

In the case where the basic treatment stage a) consists of mixing said dealuminated USY zeolite with an aqueous solution of basic compounds selected from the strong non-alkaline bases preferably selected from the quaternary ammoniums used alone or mixed and in preferred manner the strong non-alkaline base being tetramethylammonium hydroxide, the modified zeolite resulting from stage a) contains a partial or total fraction of quaternary ammonium ions in the cationic position.

In this case, the process of modification of said dealuminated USY zeolite advantageously comprises no stage b) of at least one intermediate partial or total exchange, the modified zeolite resulting from stage a) is directly subjected to the heat treatment stage c).

According to the invention, the process of modification of the dealuminated USY zeolite then comprises at least one heat treatment stage c).

In the case where the basic treatment stage a) consists of mixing said dealuminated USY zeolite with a basic aqueous solution of compounds selected from the alkaline bases and preferably selected from the alkaline carbonates and the alkaline hydroxides and in very preferred manner with a solution of sodium hydroxide (NaOH), the heat treatment stage c) allows both the drying and the conversion of the $NH_4^+$ cations exchanged during stage b) to protons.

In the case where the basic treatment stage a) consists of mixing said dealuminated USY zeolite with a basic aqueous solution of compounds selected from the strong non-alkaline bases and preferably selected from the quaternary ammoniums used alone or mixed and in preferred manner the strong non-alkaline base being tetramethylammonium hydroxide, the heat treatment stage c) allows both the drying and the decomposition of the quaternary ammonium cations in the counter-ion position and the formation of protons.

In all cases, at the end of said heat treatment stage c), the protons of the zeolite are partially or completely regenerated.

The heat treatment stage c) according to the invention is carried out at a temperature comprised between 200 and 700° C., more preferentially between 300 and 500° C. Said heat treatment stage is advantageously implemented under air, under oxygen, under hydrogen, under nitrogen or under argon or under a mixture of two or more of these gases. The duration of said treatment is advantageously comprised between 1 and 5 hours.

The dealumination treatment by acid attack makes it possible both to extract the aluminium atoms from the framework and to extract the aluminium atoms from the pores of the zeolite solid and the basic treatment of the process of modification of the dealuminated USY zeolite allows the extraction of some of the silicon atoms contained in the framework of said zeolite, the phenomenon is called desilication. The desilication creates spaces in the structure and induces the formation of a mesoporosity allowing the reinsertion of at least part of the fraction of the extra-network aluminium atoms present in said initial dealuminated Y zeolite. This second phenomenon is called re-alumination.

Thus, the overall Si/Al atomic ratio of the obtained dealuminated and optionally desilicated USY zeolite increases to a value comprised between 2.5 and 10, said zeolite being suitable for the utilization in the catalyst support used in the process according to the invention.

Moreover, said obtained dealuminated and optionally desilicated USY zeolite also has the other specific textural characteristics defined above, namely a fraction by weight of extra-network aluminium atom greater than 10% relative to the total mass of the aluminium present in the zeolite, preferably greater than 15% and in preferred manner greater than 20%, a mesopore volume measured by nitrogen porosimetry greater than $0.07$ $ml.g^{-1}$, preferably greater than $0.10$ $ml.g^{-1}$ and in preferred manner greater than $0.14$ $ml.g^{-1}$, and a crystal parameter $a_0$ of the elemental mesh greater than 24.28 Å, preferably greater than 24.29 Å and in preferred manner greater than 24.30 Å.

According to the invention, a quantity of the element nickel comprised between 0.5 and 3% by weight, preferably between 0.8 and 3% by weight and in preferred manner between 1.2 and 3% by weight relative to the total mass of the zeolite is deposited on said dealuminated and optionally desilicated USY zeolite thus obtained and suitable for the utilization in the catalyst support used in the process according to the invention.

The hydrogenating active phase deposited on said zeolite is advantageously constituted by nickel only.

By hydrogenating active phase deposited on said zeolite is meant an active phase deposited on the entire surface of said zeolite, i.e. on the microporous, mesoporous and external surface of said zeolite.

The element nickel is advantageously deposited on said dealuminated and optionally desilicated USY zeolite either by the dry impregnation technique, or by the cation exchange technique, or said element nickel is introduced during the synthesis of the zeolite.

The dry impregnation technique consists of filling the pore volume of said dealuminated and optionally desilicated USY zeolite, before its shaping, with a metallic solution containing at least one precursor of nickel at a given concentration. The precursor of nickel is advantageously selected from the precursors of nickel known to a person skilled in the art and preferably said precursor is selected from nickel nitrate, nickel chloride, nickel acetate, nickel sulphate and nickel hydroxide.

The cation exchange technique consists of exchanging the $H^+$ protons with $Ni^{2+}$ cations on the zeolite. In the case of nickel, nickel nitrate, nickel chloride, nickel acetate, nickel sulphate or nickel hydroxide is conventionally used. This cation exchange technique is advantageously used for directly depositing the nickel metal on the zeolite powder, before it is mixed with a matrix.

Alternatively, said element nickel can also be advantageously introduced during the synthesis of the zeolite according to the teaching of French patent FR 2 869 894.

The demonstration of the presence of the hydrogenating phase deposited on said dealuminated and optionally desilicated USY zeolite can be advantageously carried out by various methods known to a person skilled in the art such as for example electron microprobe and transmission electron microscopy equipped with an energy dispersive X-ray spectrometer with a detector allowing the identification and the quantification of the elements present on the zeolite crystals and in the porous mineral matrix.

The Hydrogenating Phase

According to the invention, the catalyst utilized in the process according to the invention comprises at least one hydro-dehydrogenating element selected from the group comprising elements of group VIB and of non-precious group VIII of the periodic table, used alone or mixed, and a support as defined above.

Preferably, the elements of group VIB of the periodic table are selected from the group comprising tungsten and molybdenum, used alone or mixed. According to a preferred embodiment, the hydro-dehydrogenating element selected from the group comprising elements of group VIB of the periodic table is molybdenum.

According to another preferred embodiment, the hydro-dehydrogenating element selected from the group comprising elements of group VIB of the periodic table is tungsten.

Preferably, the non-precious elements of group VIII of the periodic table are selected from the group comprising cobalt and nickel, used alone or mixed. According to a preferred embodiment, the hydro-dehydrogenating element selected from the group comprising elements of non-precious group VIII is cobalt.

According to another preferred embodiment, the hydro-dehydrogenating element selected from the group comprising elements of non-precious group VIII is nickel.

Preferably, said catalyst comprises at least one metal of group VIB in combination with at least one non-precious metal of group VIII, the non-precious elements of group VIII being selected from the group comprising cobalt and nickel, used alone or mixed, and the elements of group VIB being selected from the group comprising tungsten and molybdenum, used alone or mixed.

Advantageously, the following combinations of metals are used: nickel-molybdenum, cobalt-molybdenum, nickel-tungsten, cobalt-tungsten, the preferred combinations are: nickel-molybdenum, cobalt-molybdenum, cobalt-tungsten, nickel-tungsten and even more advantageously nickel-molybdenum and nickel-tungsten.

In the case where the catalyst comprises at least one metal of group VIB in combination with at least one non-precious metal of group VIII, the content of metal of group VIB is advantageously comprised, in percentage of oxide of the element, between 5 and 40% by weight relative to the total mass of said catalyst, in preferred manner between 8 and 35% by weight and in very preferred manner between 10 and 35% by weight and the content of non-precious metal of group VIII is advantageously comprised, in percentage of oxide of the element, between 0.5 and 10% by weight relative to the total mass of said catalyst, in preferred manner between 1 and 8% by weight and in very preferred manner between 1.5 and 6% by weight, the content of the element nickel deposited on the dealuminated USY zeolite not being comprised in said content of non-precious metal of group VIII.

It is also possible to use combinations of three metals such as for example the combinations nickel-cobalt-molybdenum, nickel-molybdenum-tungsten, nickel-cobalt-tungsten.

Said catalyst can also advantageously contain:
from 0 to 20% by weight, preferably from 0.1 to 15% by weight and in even more preferred manner from 0.1 to 10% by weight oxide of said element relative to the total mass of the catalyst of at least one doping element selected from the group constituted by silicon, boron and phosphorus, not including the silicon contained in the zeolite framework and optionally
from 0 to 60% by weight, preferably from 0.1 to 50% by weight, and in even more preferred manner from 0.1 to 40% by weight oxide of said element relative to the total mass of the catalyst, of at least one element selected from group VB and preferably niobium and optionally also
from 0 to 20% by weight, preferably from 0.1 to 15% by weight and in even more preferred manner from 0.1 to 10% by weight oxide of said element relative to the total mass of the catalyst of at least one element selected from group VIIA, preferably fluorine.

Preferably, said catalyst comprises a content of dealuminated and optionally desilicated USY zeolite, a quantity of the element nickel comprised between 0.5 and 3% by weight relative to the total mass of the zeolite being deposited on said zeolite, comprised between 0.1 and 75% by weight, preferably between 0.1 and 66% by weight and in preferred manner between 0.1 and 47% by weight relative to the total mass of said catalyst.

Preparation of the Catalyst

The catalyst used in the process according to the invention is advantageously prepared according to a preparation process comprising the following stages:

a) preparation of the dealuminated and optionally desilicated USY zeolite having the claimed specific textural characteristics according to the process described above, b) deposition on said dealuminated and optionally desilicated USY zeolite of the element nickel in a quantity comprised between 0.5 and 3% by weight relative to the total mass of the zeolite according to one of the methods described above, c) mixing with a porous mineral matrix and shaping in order to obtain the support;

d) introduction of at least one hydro-dehydrogenating element on the matrix by at least one of the following methods:

addition of at least one compound of said element during the shaping so as to introduce at least part of said element, impregnation of the support with at least one compound of said element;

e) drying and calcination of the final product obtained and optionally drying and/or calcination of the products obtained at the end of stages a) or b) or after impregnation.

Preferably, the process for the preparation of said catalyst comprises, between stage a) and stage b), a stage of desilication of said dealuminated USY zeolite obtained at the end of stage a), the desilication stage consisting of a basic treatment consisting of mixing said dealuminated USY zeolite with a basic aqueous solution, followed by a heat treatment as described above.

More precisely, the catalyst of the present invention is advantageously prepared according to the following four stages:

a) preparation of the dealuminated and optionally desilicated USY zeolite having the claimed specific textural characteristics according to the process described above, b) deposition on said dealuminated, optionally desilicated, USY zeolite of the element nickel in a quantity comprised between 0.5 and 3% by weight relative to the total mass of the zeolite according to one of the methods described above.

The stage b) is optionally followed by drying and/or calcination or by calcination without drying beforehand. The drying is advantageously carried out at a temperature comprised between 60 and 250° C. and the calcination at a temperature of 250 to 800° C. for a duration comprised between 30 minutes and 6 hours.

The impregnated zeolite can advantageously be, without this being limitative, in the form of powder, crushed powder, suspension, suspension having been subjected to a deagglomeration treatment. Thus, the impregnated zeolite can advantageously be placed in suspension, acidified or not, at a concentration adjusted to the envisaged final zeolite content on the support. This suspension, commonly called a slurry is then advantageously mixed with the precursors of the matrix.

c) shaping of the mixture of said impregnated zeolite obtained at the end of stage b) with a porous mineral matrix in order to obtain the support.

One of the preferred shaping methods consists of kneading said zeolite in a wet gel preferably of alumina for a few tens of minutes, then passing the paste thus obtained through a die in order to form extrudates with a diameter preferably comprised between 0.4 and 5 mm.

According to another of the preferred shaping methods, said zeolite can be introduced during the synthesis of the porous mineral matrix. For example, according to this preferred embodiment of the present invention, said zeolite is added during the synthesis of a matrix such as for example a silico-alumina matrix: in this case, said zeolite can be advantageously added to a mixture comprising an alumina compound in acid medium with a completely soluble silica compound.

The introduction of the elements of group VIB and/or VIII, not deposited on said zeolite, can optionally take place in this shaping stage c), by adding at least one compound of said element, so as to introduce at least some of said element. This introduction can advantageously be accompanied by that of at least one promoter element selected from phosphorus, boron and silicon and optionally by that of the element of group VIIA and/or VB. The shaped solid is then optionally dried at a temperature comprised between 60 and 250° C. and calcined at a temperature of 250 to 800° C. for a duration comprised between 30 minutes and 6 hours.

The support can advantageously be shaped by any technique known to a person skilled in the art. The shaping can be carried out for example by extrusion, by pelletizing, by the oil drop coagulation method, by turntable granulation or by any other method well known to a person skilled in the art.

d) introduction of the elements of group VIB and/or VIII, optionally of at least one promoter element (such as phosphorus), optionally of at least one element of group VIIA and optionally of at least one element of group VB, by impregnation on the calcined, or dried and preferably calcined, support obtained in stage b) when they have not been introduced in their entirety during stage b).

Stage d) is advantageously carried out by a method well known to a person skilled in the art, i.e. by one or more operations of impregnation of the shaped and calcined support with a solution containing the precursors of the elements of group VIB and/or VIII, optionally the precursor of at least one promoter element and optionally the precursor of at least one element of group VIIA and/or of group VB.

In the case where the catalyst of the present invention contains a non-precious metal of group VIII, the metals of group VIII are preferably introduced by one or more operations of impregnation of the shaped and calcined support, after those of group VIB or at the same time as the latter.

Stage d) is then optionally followed by drying at a temperature comprised between 60 and 250° C. and optionally by calcination at a temperature comprised between 250 and 800° C.

The sources of molybdenum and of tungsten are advantageously selected from the oxides and hydroxides, the molybdic and tungstic acids and their salts in particular the ammonium salts such as ammonium molybdate, ammonium heptamolybdate, ammonium tungstate, phosphomolybdic acid, phosphotungstic acid and their salts, silicomolybdic acid, silicotungstic acid and their salts. Ammonium oxides and salts such as ammonium molybdate, ammonium heptamolybdate and ammonium tungstate are preferably used.

The sources of non-precious elements of group VIII which can be used are well known to a person skilled in the art. For example, for the non-precious metals the nitrates, sulphates, hydroxides, phosphates, halides such as for example the chlorides, bromides and fluorides, the carboxylates such as for example the acetates and carbonates will be used.

The preferred source of phosphorus is orthophosphoric acid $H_3PO_4$, but its salts and esters such as the ammonium phosphates are also suitable. The phosphorus can for example be introduced in the form of a mixture of phosphoric acid and a basic organic compound containing nitrogen such as ammonia, the primary and secondary amines, the cyclic amines, the compounds of the family of pyridine and of the quinolines and the compounds of the pyrrole family. Tungstophosphoric or tungstomolybdic acids can be used.

The phosphorus content is adjusted, without this limiting the scope of the invention, so as to form a mixed compound in solution and/or on the support for example tungsten-phosphorus or molybdenum-tungsten-phosphorus. These mixed compounds can be heteropolyanions. These compounds can be Anderson heteropolyanions, for example.

The source of boron can be boric acid, preferably orthoboric acid $H_3BO_3$, ammonium biborate or pentaborate, boron oxide, the boric esters. The boron can for example be introduced in the form of a mixture of boric acid, hydrogen peroxide and a basic organic compound containing nitrogen such as ammonia, the primary and secondary amines, the cyclic amines, the compounds of the family of pyridine and of the quinolines and the compounds of the pyrrole family. The boron can be introduced for example by a solution of boric acid in a water/alcohol mixture.

Numerous sources of silicon can be used. Thus, it is possible to use ethyl orthosilicate $Si(OEt)_4$, the siloxanes, polysiloxanes, silicones, silicone emulsions, halide silicates such as ammonium fluorosilicate $(NH_4)_2SiF_6$ or sodium fluorosilicate $Na_2SiF_6$. Silicomolybdic acid and its salts, silicotungstic acid and its salts can also be advantageously used. The silicon can be added for example by impregnation of ethyl silicate in solution in a water/alcohol mixture. The silicon can be added for example by impregnation of a silicon compound of silicone type or silicic acid placed in suspension in water.

The sources of elements of group VB which can be used are well known to a person skilled in the art. For example, among the sources of niobium, it is possible to use the oxides, such as diniobium pentaoxide $Nb_2O_5$, niobic acid $Nb_2O_5.H_2O$, the niobium hydroxides and the polyoxoniobates, the niobium alkoxides of formula $Nb(OR1)_3$ where R1 is an alkyl radical, niobium oxalate $NbO(HC_2O_4)_5$, ammonium niobate. Niobium oxalate or ammonium niobate are preferably used.

The sources of elements of group VIIA which can be used are well known to a person skilled in the art. For example, the fluoride anions can be introduced in the form of hydrofluoric acid or of its salts. These salts are formed with alkaline metals, ammonium or an organic compound. In this last case, the salt is advantageously formed in the reaction mixture by reaction between the organic compound and hydrofluoric acid. It is also possible to use hydrolysable compounds capable of releasing the fluoride anions in the water, such as ammonium fluorosilicate $(NH_4)_2 SiF_6$, silicon tetrafluoride $SiF_4$ or sodium fluorosilicate $Na_2SiF_6$. The fluorine can be introduced for example by impregnation of an aqueous solution of hydrofluoric acid or of ammonium fluoride.

The catalysts used in the process according to the invention are advantageously in the form of spheres or extrudates. It is however advantageous that the catalyst is present in the form of extrudates with a diameter comprised between 0.4 and 5 mm and more particularly between 0.7 and 2.5 mm. They are in the form of cylinders (which can be hollow or not), twisted cylinders, multilobes (2, 3, 4 or 5 lobes for example), rings. The cylindrical shape is used in preferred manner, but any other shape can be used. The catalysts according to the invention can optionally be manufactured and used in the form of crushed powder, tablets, rings, beads, wheels.

According to the invention, the catalyst utilized in the process according to the invention is in the sulphide form. The metals of group VIB and/or of non-precious group VIII of said catalyst are therefore present in the sulphide form.

According to the invention and prior to the injection of the feed, the catalysts used in the processes according to the present invention are subjected beforehand to a sulphurization treatment making it possible to convert, at least partially, the metallic species to sulphide before they are brought into contact with the feed to be treated. This activation treatment by sulphurization is well known to a person skilled in the art and can be carried out by any method already described in the literature or in-situ, i.e. in the reactor, or ex-situ.

A standard sulphurization method well known to a person skilled in the art consists of heating the catalyst in the presence of hydrogen sulphide (pure or for example under a flow of a hydrogen/hydrogen sulphide mixture) to a temperature comprised between 150 and 800° C., preferably between 250 and 600° C., generally in a fluidized bed reaction zone.

Characterization Techniques

The overall Si/Al atomic ratio of the dealuminated USY zeolite used in the catalyst support utilized in the process according to the invention is measured by X-ray fluorescence. X-ray fluorescence is a total elemental analysis technique which allows analysis of all the elements of the periodic system starting from boron. It is possible to assay from a few ppm up to 100%. In this invention, this technique is used to assay the silicon and the aluminium in the zeolites (in percentage by mass) and thus makes it possible to calculate the Si/Al atomic ratio.

The fraction by weight of the tetracoordinated and hexacoordinated aluminium atoms present in said dealuminated USY zeolite is determined by solid-state $^{27}Al$ nuclear magnetic resonance. Aluminium NMR is in fact known to be used for locating and quantifying the different coordination states of this nucleus ("Analyse physico-chimiques des catalyseurs industriels", J. Lynch, Editions Technip (2001) chap. 13, pages 290 and 291). The tetracoordinated aluminium atoms $Al_{IV}$ resonate at a chemical shift comprised between +40 Ppm and +75 ppm and the hexacoordinated or extra-network aluminium atoms $Al_{vi}$ resonate at a chemical shift comprised between −15 ppm and +15 ppm. The fraction by weight of the two aluminium species $Al_{IV}$ and $Al_{VI}$ is quantified by integration of the signals corresponding to each of these species.

More precisely, said dealuminated USY zeolite was analyzed by NMR-MAS of the solid-state $^{27}Al$ on a Brücker Avance 400 MHz spectrometer using a 4-mm probe optimized for $^{27}Al$. The speed of rotation of the sample is close to 14 kHz. The aluminium atom is a quadripolar nucleus the spin of which is equal to 5/2. Under so-called selective analysis conditions, namely a weak radiofrequency field equal to 30 kHz, a small pulse angle equal to π/2 and in the presence of a sample saturated with water, the NMR technique of magic angle spinning (MAS), denoted NMR-MAS, is a quantitative technique. The decomposition of each NMR-MAS spectrum makes it possible to directly access the quantity of the different aluminium species, namely the tetracoordinated aluminium atoms $Al_{IV}$ and the hexacoordinated or extra-network aluminium atoms $Al_{VI}$. Each spectrum has a fixed chemical shift relative to a 1M solution of aluminium nitrate for which the aluminium signal is zero ppm. The signals characterizing the tetracoordinated aluminium atoms $Al_{IV}$ are integrated between +40 ppm and +75 ppm, which corresponds to area 1, and the signals characterizing the hexacoordinated aluminium atoms $Al_{VI}$ are integrated between −15 ppm and +15 ppm, which corresponds to area 2. The fraction by weight of the hexacoordinated aluminium atoms $Al_{VI}$ is equal to the ratio area 2/(area 1+area 2).

The crystal parameter of the mesh $a_0$ of said dealuminated USY zeolite is measured by X-ray diffraction (XRD). For the Y zeolite of FAU type, the mesh parameter $a_0$ is calculated from the positions of the peaks corresponding to the Miller indices 533, 642 and 555. The length of the Al—O bond being greater than that of the Si—O bond, the greater the number of aluminium atoms in the tetrahedral position in the framework of the zeolite, the greater the parameter $a_0$. For crystals constituted by cubic meshes such as the Y zeolites of FAU type, a linear relationship exists between the mesh parameter $a_0$ and the Si/Al ratio.

The micropore and mesopore volumes of said dealuminated USY zeolite are measured by nitrogen adsorption/desorption. Analysis of the nitrogen adsorption isotherm curves of the microporous and mesoporous solids makes it possible to calculate the pore volumes by the technique called the volumetric technique. Different types of models can be used. The pore distribution measured by nitrogen adsorption was determined by the Barrett-Joyner-Halenda (BJH) model. The nitrogen adsorption-desorption isotherm according to the BJH model is described in the periodical "The Journal of American Society", 73, 373, (1951) written by E. P. Barrett, L. G. Joyner and P. P. Halenda. In the following disclosure of the invention, by nitrogen adsorption volume is meant the volume measured for P/P0=0.95. The micropore volume is obtained by the "t-plot" method or by measuring the volume adsorbed at P/P0=0.35. The mesopore volume is obtained by subtracting the micropore volume from the total pore volume.

On completion of the preparation of the catalyst according to the invention, the two hydrogenating phases are quite distinct. The two hydrogenating phases are demonstrated by the method of transmission electron microscopy equipped with an energy dispersive X-ray spectrometer allowing the identification and quantification of the elements present in the zeolite crystals. For this, a JEOL 2100 HR transmission electron microscope is used, equipped with a JEOL EX-2300-BU energy dispersive X-ray spectrometer. The catalyst extrudates are finely ground in a mortar. The powder is incorporated in resin in order to produce ultrafine sections with a thickness of 700 Å for the two catalysts. The sections produced are collected on a Cu grid covered with a C membrane with holes serving as a support for the preparation. These preparations are dried under an I.R. lamp before being introduced into the transmission electron microscope where they are subjected to a primary vacuum for a few minutes then to a secondary vacuum throughout the observation. The electron microscope makes it possible to accurately identify the zeolite crystals with a size of approximately 0.4 micron dispersed in the alumina matrix. A certain number of local analyses (from 15 to 20) is then carried out on various matrix zones and on various zeolite crystals with a probe beam 0.1 micron in diameter. The quantitative treatment of the signal makes it possible to obtain the relative concentration in atomic % of the elements (excluding oxygen).

Hydrocracking and Hydrotreatment Processes

The invention relates to a hydrocracking and/or hydrotreatment process taking place in the presence of hydrogen, at a temperature above 200° C., under a pressure greater than 1 MPa, the space velocity being comprised between 0.1 and 20 h-1 and the quantity of hydrogen introduced is such that the litre of hydrogen/litre of hydrocarbon volume ratio is comprised between 80 and 5000 L/L.

More particularly, the invention relates to a hydroconversion, and in particular a hydrocracking, process as well as to a process for hydrotreatment of hydrocarbon feeds using the catalyst described above.

Preferably, the hydrocracking process according to the invention takes place in the presence of hydrogen, at a temperature above 200° C., preferably comprised between 250 and 480° C., in preferred manner between 320 and 450° C., in very preferred manner between 330 and 435° C., under a pressure greater than 1 MPa, preferably between 2 and 25 MPa, in preferred manner between 3 and 20 MPa, at a space velocity comprised between 0.1 and 20 $h^{-1}$, preferably 0.1 and 6 $h^{-1}$, in preferred manner between 0.2 and 3 $h^{-1}$, and the quantity of hydrogen introduced is such that the litre of hydrogen/litre of hydrocarbon volume ratio is comprised between 80 and 5000 L/L and most often between 100 and 2000 L/L.

These operating conditions used in the processes according to the invention generally make it possible to achieve conversions, in each pass, to products having boiling points below 340° C., and, better, below 370° C., greater than 15% by weight and in even more preferred manner comprised between 20 and 95% by weight.

The invention also relates to a process for hydrotreatment of hydrocarbon feeds using the catalyst described above, said hydrotreatment process advantageously being able to be placed alone or upstream of a hydrocracking process. Said hydrotreatment process is described below.

Feeds

Very varied feeds can be treated by the processes according to the invention described above. They advantageously contain at least 20% by volume and preferably at least 80% by volume compounds boiling above 340° C.

The feed is advantageously selected from LCOs (Light Cycle Oils=light gas oils resulting from a catalytic cracking unit), atmospheric distillates, vacuum distillates such as for example gas oils resulting from direct distillation of crude or from conversion units such as FCC, coking or visbreaking units, the feeds originating from units for the extraction of aromatics from lubricating oil bases or resulting from solvent dewaxing of the lubricating oil bases, the distillates originating from desulphurization or fixed-bed or fluidized-bed hydroconversion processes of ATRs (atmospheric residues) and/or of VRs (vacuum residues) and/or of deasphalted oils, and deasphalted oils, used alone or mixed. The above list is not limitative. The paraffins resulting from the Fischer-Tropsch process are excluded. Said feeds preferably have a boiling point T5 above 340° C., preferably above 370° C., i.e. 95% of the compounds present in the feed have a boiling point above 340° C., and in preferred manner above 370° C.

The nitrogen content of the feeds treated in the processes according to the invention is advantageously greater than 500 ppm by weight, preferably comprised between 500 and 10000 ppm by weight, in more preferred manner between 700 and 4000 ppm by weight and in even more preferred manner between 1000 and 4000 ppm by weight. The sulphur content of the feeds treated in the processes according to the invention is advantageously comprised between 0.01 and 5% by weight, in preferred manner comprised between 0.2 and 4% by weight and in even more preferred manner between 0.5 and 3% by weight.

The feed can optionally contain metals. The accumulated nickel and vanadium content of the feeds treated in the processes according to the invention is preferably less than 1 ppm by weight.

The feed can optionally contain asphaltenes. The asphaltenes content is generally less than 3000 ppm by weight, in preferred manner less than 1000 ppm by weight, in even more preferred manner less than 200 ppm by weight.

Guard Beds

In the case where the feed contains resin- and/or asphaltene-type compounds, it is advantageous to pass the feed over a catalyst or adsorbent bed different from the hydrocracking or hydrotreatment catalyst beforehand. The catalysts or guard beds which can be advantageously used upstream of the hydrocracking and/or hydrotreatment process according to the invention are described in the patent FR 2 888 584.

Embodiments

The hydrocracking processes according to the invention utilizing the catalysts described above cover the pressure and conversion ranges from mild hydrocracking to high-pressure hydrocracking. By mild hydrocracking is meant hydrocracking leading to moderate conversions, generally less than 40%, and operating at low pressure, generally between 2 MPa and 6 MPa.

The hydrocracking processes according to the invention can advantageously utilize said catalyst described above alone, in a single or several fixed catalytic beds, in one or more reactors, in a so-called single-stage hydrocracking system, with or without liquid recycling of the unconverted fraction, optionally in combination with a standard hydrotreatment catalyst situated upstream of the catalyst used in the process according to the present invention.

The hydrocracking processes according to the invention can advantageously also utilize said catalyst described above alone, in a single or several fluidized bed reactors, in a so-called single-stage hydrocracking system, with or without liquid recycling of the unconverted fraction, optionally in combination with a standard hydrotreatment catalyst situated in a fixed-bed or fluidized-bed reactor upstream of the catalyst used in the process according to the present invention.

The fluidized bed operates with daily removal of spent catalyst and addition of new catalyst in order to keep the catalyst activity stable.

The catalyst described according to the invention can also advantageously be used in the first hydrotreatment reaction zone, in converting pretreatment, alone or in combination with another standard hydrorefining catalyst, situated upstream of the catalyst described according to the invention, in one or more catalytic bed(s), in one or more reactor(s), in a fixed bed or in a fluidized bed.

So-Called Single-Stage Process

The hydrocracking process according to the invention can advantageously be utilized in a so-called single-stage process.

So-called single-stage hydrocracking primarily and generally comprises rigorous hydrorefining the purpose of which is to carry out rigorous hydrodenitrogenation and desulphurization of the feed before the latter is sent over the actual hydrocracking catalyst, in particular in the case where the latter comprises a zeolite. This rigorous hydrorefining of the feed results in only a limited conversion of the feed to lighter fractions, which is still insufficient and must therefore be completed on the more active hydrocracking catalyst described above. However, it is to be noted that no separation occurs between the two types of catalysts. All of the effluent leaving the reactor is injected onto said actual hydrocracking catalyst and it is only afterwards that a separation of the products formed is carried out. This version of hydrocracking, also called "Once Through", has a variant with recycling of the unconverted fraction to the reactor for more rigorous conversion of the feed.

The catalyst described according to the invention is therefore advantageously utilized in a so-called single-stage hydrocracking process, in a hydrocracking zone placed downstream of a hydrorefining zone, no intermediate separation being implemented between the two zones.

Preferably, the hydrorefining catalyst used in the first hydrorefining reaction zone, alone or in combination with another standard hydrorefining catalyst, situated upstream of the hydrocracking catalyst described according to the invention, is a catalyst based on non-precious elements of group VIII and optionally in combination with elements of group VIB on an alumina or silica-alumina support. Preferably, said hydrorefining catalyst comprises either nickel and tungsten, or nickel and molybdenum, or cobalt and molybdenum. Said catalyst also optionally comprises a doping element selected from phosphorus, boron and silicon.

The catalyst described according to the invention can also advantageously be used in the first hydrorefining reaction zone, in converting pretreatment, alone or in combination with another standard hydrorefining catalyst, situated upstream of said catalyst described according to the invention, in one or more catalytic bed(s), in one or more reactor(s).

So-Called Single-Stage Process in a Fixed Bed with Intermediate Separation

The hydrocracking process according to the invention can advantageously be utilized in a so-called single-stage process in a fixed bed with intermediate separation.

Said process advantageously comprises a hydrorefining zone, a zone allowing the partial removal of ammonia, for example by means of a hot flash, and a zone comprising said hydrocracking catalyst according to the invention. This single-stage process for hydrocracking of hydrocarbon feeds for the production of middle distillates and optionally of oil bases advantageously comprises at least one first hydrorefining reaction zone, and at least one second reaction zone, in which the hydrocracking of at least part of the effluent of the first reaction zone is carried out. This process also advantageously comprises an incomplete separation of the ammonia from the effluent leaving the first zone. This separation is advantageously carried out by means of an intermediate hot flash. The hydrocracking taking place in the second reaction zone is advantageously carried out in the presence of ammonia in a quantity less than the quantity present in the feed, preferably less than 1500 ppm by weight, in more preferred manner less than 1000 ppm by weight and in even more preferred manner less than 800 ppm by weight of nitrogen.

The catalyst described according to the invention is therefore advantageously utilized in a so-called single-stage hydrocracking process in a fixed bed with intermediate separation, in a hydrocracking zone placed downstream of a hydrorefining zone, an intermediate separation of partial removal of ammonia being implemented between the two zones.

Preferably, the hydrorefining catalyst used in the first hydrorefining reaction zone, alone or in combination with another standard hydrorefining catalyst, situated upstream of the catalyst described according to the invention, is identical to the hydrorefining catalyst described in the case of a so-called single-stage process.

The catalyst described according to the invention can also advantageously be used in the first hydrorefining reaction zone, in converting pretreatment, alone or in combination with another standard hydrorefining catalyst, situated upstream of the catalyst described according to the invention, in one or more catalytic bed(s), in one or more reactor(s).

So-Called Two-Stage Process

The hydrocracking process according to the invention can advantageously be utilized in a so-called two-stage process.

Two-stage hydrocracking comprises a first stage which has the objective, as in the "single-stage" process, of carrying out the hydrorefining of the feed, but also of achieving a conversion of the latter generally of the order of 40 to 60%. The effluent resulting from the first stage is then subjected to a separation (distillation) most often called intermediate separation, which has the objective of separating the conversion products from the unconverted fraction. In the second stage of a two-stage hydrocracking process, only the fraction of the feed not converted during the first stage is treated. This separation allows a two-stage hydrocracking process to be more selective of middle distillates (kerosene+diesel) than a single-stage process. In fact, the intermediate separation of the conversion products prevents their "over-cracking" to naphtha and gas in the second stage on the hydrocracking catalyst. Moreover, it is to be noted that the unconverted fraction of the feed treated in the second stage generally has a very low content of $NH_3$, as well as of organic nitrogen compounds, in general less than 20 ppm by weight or even less than 10 ppm by weight.

The configurations of fixed or fluidized catalytic beds described in the case of a so-called single-stage process can advantageously be used in the first stage of a so-called two-stage system, whether the catalyst according to the invention is used alone or in combination with a standard hydrorefining catalyst.

The catalyst described according to the invention is therefore advantageously utilized in a so-called two-stage hydrocracking process, in the second hydrocracking stage placed downstream of the first hydrorefining stage, an intermediate separation being implemented between the two zones.

For the so-called single-stage processes and for the first hydrorefining stage of the so-called two-stage hydrocracking processes, the standard hydrorefining catalysts which can advantageously be used are catalysts identical to the hydrorefining catalyst described in the case of a so-called single-stage process.

Hydrotreatment/Hydrorefining of Hydrocarbon Feeds

The invention also relates to a process for hydrotreatment of hydrocarbon feeds using the catalyst described above, said hydrotreatment process advantageously being able to be placed alone or upstream of a hydrocracking process.

The hydrotreatment and hydrorefining of hydrocarbon feeds, such as petroleum cuts, cuts resulting from the carbon or hydrocarbons produced from natural gas, involve the hydrogenation, hydrodesulphurization, hydrodenitrogenation, hydrodeoxygenation, hydrodearomatization and the hydrodemetallation of hydrocarbon feeds containing aromatic and/or olefinic and/or naphthenic and/or paraffinic compounds, said feeds optionally containing metals and/or nitrogen and/or oxygen and/or sulphur.

More particularly, the feeds used in the hydrotreatment processes according to the invention are gasolines, gas oils, vacuum gas oils, atmospheric residues, vacuum residues, atmospheric distillates, vacuum distillates, heavy fuels, oils, waxes and paraffins, spent oils, deasphalted residues or crudes, feeds originating from the thermal or catalytic conversion processes and their mixtures. They preferably contain heteroatoms such as sulphur, oxygen and nitrogen and/or at least one metal.

The hydrotreatment process according to the invention advantageously takes place at a temperature comprised between 200 and 450 C, preferably between 250 and 440° C., at a pressure comprised between 1 and 25 MPa, preferably between 1 and 18 MPa, at an hourly space velocity comprised between 0.1 and 20 $h^{-1}$, in preferred manner between 0.2 and 5 $h^{-1}$, and at a hydrogen/feed ratio expressed in volume of hydrogen, measured under normal temperature and pressure conditions, per volume of liquid feed generally comprised between 80 L/L and 5000 L/L and preferably between 100 L/L and 2000 L/L.

In the case where said hydrotreatment process is placed alone or upstream of a hydrocracking process, the catalyst described according to the invention can advantageously be used in the hydrotreatment reaction zone, in converting pretreatment, alone or in combination with another standard hydrotreatment catalyst, situated upstream of the catalyst described according to the invention, in one or more catalytic bed(s), in one or more reactor(s). The catalyst used in the hydrocracking process placed downstream of the hydrotreatment process according to the invention can advantageously be identical to or different from the catalyst used in the hydrotreatment process according to the invention.

The following examples illustrate the present invention without however limiting its scope.

Example 1

Preparation of Zeolite Z1

A commercial USY zeolite is considered which has an overall Si/Al atomic ratio=5.5 measured by X-ray fluorescence, a fraction by weight of initial extra-network aluminium atoms equal to 40% by weight relative to the total mass of the aluminium present in the zeolite and measured by NMR of the aluminium, an initial mesopore volume measured by nitrogen porosimetry equal to 0.14 ml.g-1, and an initial crystal parameter a0 of the elemental mesh equal to 24.34 Å, measured by XRD. 30 g of this USY zeolite is dry impregnated with a solution of nickel nitrate so as to deposit 2.2% by weight nickel relative to the weight of the dry zeolite. The impregnated USY zeolite is then dried overnight at 120° C. and then subjected to a heat treatment at 450° C. for 2 h preceded by 1-hour plateaux at 150° C., 250° C. and 350° C. The heat treatment is carried out using an air flow-rate of 2 $L.h^{-1}.g^{-1}$ of zeolite. The zeolite Z1 obtained has an overall Si/Al atomic ratio=5.5 and an Ni content equal to 2.2% by weight measured by X-ray fluorescence relative to the mass of dry zeolite, a fraction by weight of extra-network aluminium atom measured by NMR of the aluminium equal to 39% by weight relative to the total mass of the aluminium present in the zeolite, a mesopore volume measured by nitrogen porosimetry equal to 0.14 $ml.g^{-1}$, a micropore volume measured by nitrogen porosimetry equal to 0.28 $ml.g^{-1}$ and a crystal parameter $a_0$ of the elemental mesh measured by XRD equal to 24.34 Å. These characteristics are reported in Table 1.

Example 2

Preparation of Zeolite Z2

A commercial USY zeolite is considered which has an overall Si/Al atomic ratio=13.8 measured by X-ray fluorescence, a fraction by weight of initial extra-network aluminium atom equal to 15% by weight relative to the total mass of the aluminium present in the zeolite and measured by NMR of the aluminium, an initial mesopore volume measured by nitrogen porosimetry equal to 0.15 ml.g-1, and an initial crystal parameter a0 of the elemental mesh equal to 24.29 Å, measured by XRD. 30 g of this USY zeolite is dry impregnated with a solution of nickel nitrate so as to deposit 2.2% by weight nickel relative to the weight of the dry zeolite. The impregnated USY zeolite is then dried overnight at 120° C. and then subjected to a heat treatment at 450° C. for 2 h preceded by 1-hour plateaux at 150° C., 250° C. and 350° C. The heat treatment is carried out using an air flow-rate of 2 $L.h^{-1}.g^{-1}$ of zeolite. The zeolite Z2 obtained has an overall Si/Al atomic ratio=13.8 and an Ni content equal to 2.2% by weight measured by X-ray fluorescence relative to the mass of dry zeolite, a fraction by weight of extra-network aluminium atom measured by NMR of the aluminium equal to 14% by weight relative to the total mass of the aluminium present in the zeolite, a mesopore volume measured by nitrogen porosimetry equal to 0.14 $ml.g^{-1}$, a micropore volume measured by nitrogen porosimetry equal to 0.32 $ml.g^{-1}$ and a crystal parameter $a_0$ of the elemental mesh measured by XRD equal to 24.29 Å. These characteristics are reported in Table 1.

Example 3

Preparation of Zeolite Z3

A commercial USY zeolite is considered which has an overall Si/Al atomic ratio=5.5 measured by X-ray fluorescence, a fraction by weight of initial extra-network aluminium atom equal to 40% by weight relative to the total mass of the aluminium present in the zeolite and measured by NMR of the aluminium, an initial mesopore volume measured by nitrogen porosimetry equal to 0.14 $ml.g^{-1}$, and an initial crystal parameter $a_0$ of the elemental mesh equal to 24.34 Å, measured by XRD. 30 g of this USY zeolite is dry impregnated with a solution of nickel nitrate so as to deposit 3.5% by weight nickel relative to the weight of the dry zeolite. The impregnated USY zeolite is then dried overnight at 120° C. and then subjected to a heat treatment at 450° C. for 2 h preceded by 1-hour plateaux at 150° C., 250° C. and 350° C. The heat treatment is carried out using an air flow-rate of 2 $L.h^{-1}.g^{-1}$ of zeolite. The zeolite Z3 obtained has an overall Si/Al atomic ratio=5.5 and an Ni content equal to 3.6% by weight measured by X-ray fluorescence relative to the mass of dry zeolite, a fraction by weight of extra-network aluminium atom measured by NMR of the aluminium equal to 39% by weight relative to the total mass of the aluminium present in the zeolite, a mesopore volume measured by nitrogen porosimetry equal to 0.14 ml.g$^{-1}$, a micropore volume measured by nitrogen porosimetry equal to 0.27 ml.g-1 and a crystal parameter $a_0$ of the elemental mesh measured by XRD equal to 24.34 Å. These characteristics are reported in Table 1.

Example 4

Preparation of Zeolite Z4

A commercial USY zeolite is considered which has an overall Si/Al atomic ratio=13.8 measured by X-ray fluorescence, a fraction by weight of initial extra-network aluminium atom equal to 15% by weight relative to the total mass of the aluminium present in the zeolite and measured by NMR of the aluminium, an initial mesopore volume measured by nitrogen porosimetry equal to 0.15 ml.g$^{-1}$, and an initial crystal parameter a0 of the elemental mesh equal to 24.29 Å, measured by XRD. 30 g of this USY zeolite is dry impregnated with a solution of nickel nitrate so as to deposit 3.5% by weight nickel relative to the weight of the dry zeolite. The impregnated USY zeolite is then dried overnight at 120° C. and then subjected to a heat treatment at 450° C. for 2 h preceded by 1-hour plateaux at 150° C., 250° C. and 350° C. The heat treatment is carried out using an air flow-rate of 2 L.h$^{-1}$.g$^{-1}$ of zeolite. The zeolite Z4 obtained has an overall Si/Al atomic ratio=13.8 and an Ni content equal to 3.5% by weight measured by X-ray fluorescence relative to the mass of dry zeolite, a fraction by weight of extra-network aluminium atom measured by NMR of the aluminium equal to 14% by weight relative to the total mass of the aluminium present in the zeolite, a mesopore volume measured by nitrogen porosimetry equal to 0.14 ml.g$^{-1}$, a micropore volume measured by nitrogen porosimetry equal to 0.32 ml.g$^{-1}$ and a crystal parameter $a_0$ of the elemental mesh measured by XRD equal to 24.29 Å. These characteristics are reported in Table 1.

Example 5

Preparation of Zeolite Z5

A commercial USY zeolite is considered which has an overall Si/Al atomic ratio=5.5 measured by X-ray fluorescence, a fraction by weight of initial extra-network aluminium atom equal to 40% by weight relative to the total mass of the aluminium present in the zeolite and measured by NMR of the aluminium, an initial mesopore volume measured by nitrogen porosimetry equal to 0.14 ml.g-1, and an initial crystal parameter a0 of the elemental mesh equal to 24.34 Å, measured by XRD. 30 g of this USY zeolite is dry impregnated with a solution of cobalt nitrate so as to deposit 2.2% by weight cobalt relative to the weight of the dry zeolite. The impregnated USY zeolite is then dried overnight at 120° C. and then subjected to a heat treatment at 450° C. for 2 h preceded by 1-hour plateaux at 150° C., 250° C. and 350° C. The heat treatment is carried out using an air flow-rate of 2 L.h$^{-1}$.g$^{-1}$ of zeolite. The zeolite Z5 obtained has an overall Si/Al atomic ratio=5.5 and a Co content equal to 2.2% by weight measured by X-ray fluorescence relative to the mass of dry zeolite, a fraction by weight of extra-network aluminium atom measured by NMR of the aluminium equal to 39% by weight relative to the total mass of the aluminium present in the zeolite, a mesopore volume measured by nitrogen porosimetry equal to 0.14 ml.g$^{-1}$, a micropore volume measured by nitrogen porosimetry equal to 0.28 ml.g$^{-1}$ and a crystal parameter $a_0$ of the elemental mesh measured by XRD equal to 24.34 Å. These characteristics are reported in Table 1.

Example 6

Preparation of Zeolite Z6

A commercial USY zeolite is considered which has an overall Si/Al atomic ratio=5.5 measured by X-ray fluorescence, a fraction by weight of initial extra-network aluminium atom equal to 39% by weight relative to the total mass of the aluminium present in the zeolite and measured by NMR of the aluminium, an initial mesopore volume measured by nitrogen porosimetry equal to 0.14 ml.g$^{-1}$, and an initial crystal parameter $a_0$ of the elemental mesh equal to 24.34 Å, measured by XRD.

30 g of this dealuminated zeolite is mixed with 300 mL of a 0.1 N sodium hydroxide (NaOH) solution at 60° C. for 30 min. After rapid cooling in iced water, the suspension is then filtered and the zeolite is washed at 50° C. and dried overnight at 120° C. The modified dealuminated Y zeolite is then exchanged 3 times with a 1N solution of NH$_4$NO$_3$ at a temperature of 80° C. in order to obtain the partially exchanged NH$_4^+$ form. The zeolite is finally calcined at 450° C. for 2 h under a flow of air of 1 L.h$^{-1}$.g$^{-1}$ of zeolite.

This dealuminated and desilicated USY zeolite is then dry impregnated with a nickel nitrate solution so as to deposit 2.2% by weight nickel relative to the weight of the dry zeolite. The impregnated dealuminated and desilicated USY zeolite is then dried overnight at 120° C. and then subjected to a heat treatment at 450° C. for 2 h preceded by 1-hour plateaux at 150° C., 250° C. and 350° C. The heat treatment is carried out using an air flow-rate of 2 L.h$^{-1}$.g$^{-1}$ of zeolite.

The zeolite Z6 obtained has an overall Si/Al atomic ratio=4.7 and an Ni content equal to 2.1% by weight measured by X-ray fluorescence relative to the mass of dry zeolite, a fraction by weight of extra-network aluminium atom measured by NMR of the aluminium equal to 33% by weight relative to the total mass of the aluminium present in the zeolite, a mesopore volume measured by nitrogen porosimetry equal to 0.28 ml.g$^{-1}$, a micropore volume measured by nitrogen porosimetry equal to 0.25 ml.g$^{-1}$ and a crystal parameter $a_0$ of the elemental mesh measured by XRD equal to 24.39 Å. These characteristics are reported in Table 1.

TABLE 1

Characterization of the samples.

| | Zeolite | | | | | |
|---|---|---|---|---|---|---|
| | Z1 according to the invention | Z2 not according to the invention | Z3 not according to the invention | Z4 not according to the invention | Z5 not according to the invention | Z6 according to the invention |
| Overall Si/Al atomic ratio (XRF) | 5.5 | 13.8 | 5.5 | 13.8 | 5.5 | 4.7 |
| % by weight Ni (XRF) | 2.2 | 2.2 | 3.6 | 3.5 | 2.2 | 2.1 |
| % by weight $Al_{VI}$ (NMR) | 39 | 14 | 39 | 14 | 39 | 33 |
| Mesopore vol. in ml · g$^{-1}$ (BJH) | 0.14 | 0.15 | 0.14 | 0.14 | 0.14 | 0.28 |
| Mesh parameter $a_0$ in Å (XRD) | 24.34 | 24.29 | 24.34 | 24.29 | 24.34 | 24.39 |
| Micropore vol. in ml · g$^{-1}$ (BJH) | 0.28 | 0.32 | 0.27 | 0.32 | 0.28 | 0.25 |

Example 7

Preparation of the Catalysts

The catalyst supports according to the invention containing zeolites Z1 to Z6 are produced using 12 g of zeolite mixed with 88 g of a matrix composed of ultrafine tabular boehmite or alumina gel marketed under the name Pural SB3 by Condea Chemie GmbH. This mixture of powder is then mixed with an aqueous solution containing 60% by weight nitric acid then kneaded for 30 minutes, followed by the addition of an aqueous solution containing 20% by weight ammonia. The resulting mixture is then kneaded for 15 minutes then extruded. The extrudates are then calcined at 600° C. for 2 hours under air, the gas flow-rate being 1.5 L.h$^{-1}$.g$^{-1}$ of support.

The extrudates thus prepared contain 12% by weight zeolite Z1 to Z6 comprising the respective quantities of the element nickel as indicated in Table 1 above, which corresponds respectively to 11.66, 11.66, 11.47, 11.45, 11.64 and 11.68% by weight USY zeolite relative to the total mass of said support. They are then dry impregnated with a solution of a mixture of molybdenum oxide and nickel hydroxide so as to deposit 13% by weight $MoO_3$ and 2.7% by weight NiO (without taking into account the Ni already present on the zeolite). The extrudates are then calcined under air at 500° C. for 2 h, the gas flow-rate being 1 L.h$^{-1}$.g$^{-1}$ of catalyst. Catalysts C1 and C6, according to the invention, and catalysts C2, C3, C4 and C5, not according to the invention, are thus prepared from zeolites Z1 and Z6, and Z2, Z3, Z4 and Z5, respectively.

Example 8

Analyses of the Catalysts

Catalysts C1, C2, C3, C4, C5 and C6 were analyzed so as to demonstrate the presence of two distinct hydrogenating phases: one made up of nickel and deposited on the zeolite and the other made up of nickel and molybdenum and deposited on the alumina oxide matrix.

The method used is transmission electron microscopy equipped with an energy dispersive X-ray spectrometer allowing the identification and quantification of the elements present in the zeolite crystals.

For this, a JEOL 2100 HR transmission electron microscope is used, equipped with a JEOL Ex-2300-BU energy dispersive spectrometer. The catalyst extrudates are finely ground in a mortar. The powder is incorporated in resin in order to produce ultrafine sections with a thickness of 700 Å for both catalysts. The sections produced are collected on a Cu grid covered with a C membrane with holes serving as a support for the preparation. These preparations are dried under an I.R. lamp before being introduced into the transmission electron microscope, where they are subjected to a primary vacuum for a few minutes then to a secondary vacuum throughout the observation. The electron microscope makes it possible to accurately identify the zeolite crystals with a size of approximately 0.4 micron dispersed in the alumina matrix. A certain number of local analyses (from 15 to 20) is then carried out on various matrix zones and on various zeolite crystals with a probe beam 0.1 micron in diameter. The quantitative treatment of the signal makes it possible to obtain the relative concentration in atomic % of the elements (excluding oxygen).

Table 2 summarizes the results obtained for the catalysts described in the examples above.

TABLE 2

EDS analyses of the catalysts

| Catalyst | Zone analyzed | Si at. % | Al at. % | Ni(Co) at. % | Mo at. % | Si/Al at./at. | Ni(Co)/Mo at./at. |
|---|---|---|---|---|---|---|---|
| C1 | Zeolite | 83.3 | 14.4 | 2.3 | 0.2 | 5.8 | — |
| C1 | Alumina | 0.2 | 91.0 | 2.5 | 6.3 | — | 0.4 |
| C2 | Zeolite | 91.0 | 6.7 | 2.3 | 0.1 | 13.6 | — |
| C2 | Alumina | 0.3 | 91.3 | 2.4 | 6.0 | — | 0.4 |
| C3 | Zeolite | 81.8 | 14.4 | 3.7 | 0.2 | 5.7 | — |
| C3 | Alumina | 0.1 | 90.9 | 2.6 | 6.4 | — | 0.4 |
| C4 | Zeolite | 89.4 | 7.0 | 3.5 | 0.1 | 12.8 | — |
| C4 | Alumina | 0.2 | 91.3 | 2.4 | 6.1 | — | 0.4 |
| C5 | Zeolite | 83.2 | 14.4 | 2.3 | 0.3 | 5.8 | — |
| C5 | Alumina | 0.1 | 91.3 | 2.5 | 6.2 | — | 0.4 |
| C6 | Zeolite | 79.7 | 17.3 | 2.8 | 0.2 | 4.6 | — |
| C6 | Alumina | 0.3 | 90.7 | 2.6 | 6.4 | — | 0.4 |

Table 2 shows that all the catalysts have nickel supported on the Y zeolite crystals, or cobalt in the case of C5. The molybdenum which is introduced during the dry impregnation of the support extrudates, is found exclusively on the alumina. The preparation method therefore makes it possible to have, on the final catalyst, both nickel, or cobalt in the case of catalyst C5, present on the zeolite and resulting from the prior dry impregnation of the zeolite, and a second active phase comprising molybdenum and nickel present on the alumina and resulting from the dry impregnation of the support extrudates.

Example 9

Comparison of the Catalysts in hydrocracking of a Model Molecule, Squalane

The catalysts the preparations of which are described in the previous examples are used under high-conversion (60-100%) hydrocracking conditions. The petroleum feed is made up of a model molecule, squalane, a nitrogen-containing molecule, aniline, and a sulphur-containing molecule, dimethyl disulphide (DMDS). These two compounds make it possible to simulate the partial pressures of $H_2S$ and of $NH_3$ present under actual hydrocracking conditions. The characteristics of the feed are given in Table 3.

TABLE 3

Characteristics of the feed used.

| | |
|---|---|
| Density (20/4) | 0.8118 |
| DMDS (% by weight) | 1.5 |
| Aniline (% by weight) | 0.5 |
| Squalane (% by weight) | 98 |

The feed thus prepared is injected into the hydrocracking test unit which comprises a fixed bed reactor, with downward flow of the feed, into which 20 cm³ of catalyst is introduced. The catalyst is sulphided with a mixture of Cyclohexane/Toluene/DMDS+aniline up to 350° C. The test feed is then injected onto the catalyst, then the test protocol takes place under the operating conditions given in Table 4.

TABLE 4

Catalyst test conditions.

| | |
|---|---|
| Total pressure | 6 Mpa |
| Catalyst | 20 cm³ |
| Hydrogen flow-rate | 20 L/h |
| Feed flow-rate | 20 cm³/h |

The temperature is adjusted in order to obtain 70% crude conversion on the catalyst. The catalytic performances are expressed by the temperature which makes it possible to achieve this 70% crude conversion level and by the yield of middle distillates (kerosene+gas oil).

The crude conversion CC is equal to:

CC=% by weight 370° C. or less in the effluent with "370° C. or less" representing the fraction distilled at a temperature below or equal to 370° C.

The kerosene yield (150-250) is equal to the % by weight of compounds having a boiling point comprised between 150 and 250° C. in the effluents. The gas oil yield (250-370) is equal to the % by weight of compounds having a boiling point comprised between 250 and 370° C. in the effluents. The middle-distillates yield, denoted MD yield below, is equal to the sum of these two yields.

In Table 5, we report the reaction temperature and the yield of middle distillates for the catalysts described in the examples above.

TABLE 5

Catalytic activities of the catalysts in hydrocracking.

| | T (° C.) at 70% conversion | MD yield (% by weight) |
|---|---|---|
| C1 according to the invention (prepared from Z1) | 348 | 64.1 |
| C2 not according to the invention (prepared from Z2) | 352 | 63.4 |
| C3 not according to the invention (prepared from Z3) | 349 | 62.4 |
| C4 not according to the invention (prepared from Z4) | 353 | 61.1 |
| C5 not according to the invention (prepared from Z5) | 353 | 57.8 |
| C6 according to the invention (prepared from Z6) | 348 | 64.9 |

Catalysts C1 and C6 according to the invention prepared from zeolites Z1 and Z6 make it possible to obtain both an activity and a middle-distillates selectivity (kerosene+gas oil) improved relative to catalysts C2, C3, C4 and C5 not according to the invention, respectively prepared from zeolites Z2, Z3 and Z4 which have either an overall Si/Al ratio greater than that required according to the present invention i.e. greater than 10 in the case of Z2, or an Ni content greater than that required, i.e. greater than 3% in the case of Z3, or both in the case of Z4, but also relative to the catalyst C5 not according to the invention prepared from zeolite Z5 which was impregnated with cobalt and not with nickel as required by the invention.

These results show that the use of a dealuminated USY zeolite having very particular textural characteristics, in particular an overall silicon-to-aluminium atomic ratio comprised between 3 and 10, associated with the joint presence of a hydrogenating function deposited on the matrix and a hydrogenating function constituted by nickel deposited on said zeolite, in particular a quantity of the element nickel comprised between 0.5 and 3% by weight relative to the total mass of the zeolite make it possible to obtain an increase in the yield and the middle-distillates selectivity compared with catalysts of the prior art comprising zeolites not satisfying the required conditions.

Without further elaboration, it is believed that one skilled in the art can, using the preceding description, utilize the present invention to its fullest extent. The preceding preferred specific embodiments are, therefore, to be construed as merely illustrative, and not limitative of the remainder of the disclosure in any way whatsoever.

The entire disclosures of all applications, patents and publications, cited herein and of corresponding French application Ser. No. 11/00043, filed Jan. 7, 2011, are incorporated by reference herein.

From the foregoing description, one skilled in the art can easily ascertain the essential characteristics of this invention and, without departing from the spirit and scope thereof, can make various changes and modifications of the invention to adapt it to various usages and conditions.

The invention claimed is:

1. A process for the preparation of a catalyst comprising at least one hydro-dehydrogenating element of group VIB and or non-precious group VIII of the periodic table, used alone or mixed, and a support comprising at least one porous mineral matrix and at least one dealuminated USY zeolite, said process comprising:

a) preparation of a dealuminated zeolite having an overall silicon-to-aluminium atomic ratio comprised between 2.5 and 10, a fraction by weight of extra-network aluminium atom greater than 10% relative to the total mass of the aluminium present in the zeolite, a mesopore volume measured by nitrogen porosimetry greater than 0.07 ml.g$^{-1}$, and a crystal parameter $a_0$ of the elemental mesh greater than 24.28 Å, b) deposition on said dealuminated zeolite of the element nickel in a quantity comprised between 0.5 and 3% by weight relative to the total mass of the zeolite c) shaping a mixture of zeolite impregnated with nickel obtained in (b) with a porous mineral matrix in order to obtain the support;

d) introduction of at least one hydro-dehydrogenating element on the matrix by at least one of the following methods:

addition of at least one compound of said element during the shaping so as to introduce at least part of said element, impregnation of the support with at least one compound of said element;

e) drying and calcination of the final product obtained.

2. The preparation process according to claim 1 in which said dealuminated USY zeolite is subjected to a desilication stage comprising a) basic treatment comprising mixing said dealuminated USY zeolite with a basic aqueous solution, said basic aqueous solution being a solution of alkaline bases and strong non-alkaline bases, a) being carried out at a temperature comprised between 40 and 100° C. and for a duration comprised between 5 minutes and 5 h and at least one heat treatment stage c) carried out at a temperature comprised between 200 and 700° C.

3. The preparation process according to claim 1 in which the elemental nickel is deposited on said dealuminated USY zeolite either by the dry impregnation technique, or by cation exchange technique, or elemental nickel is introduced during the synthesis of the zeolite.

4. The preparation process according to claim 1 in which b) is followed by drying and/or calcination or by calcination without drying beforehand.

5. The preparation process according to claim 4 in which the drying is carried out at a temperature comprised between 60 and 250° C. and the calcination at a temperature of 250 to 800° C. for a duration comprised between 30 minutes and 6 hours.

6. The preparation process according to claim 1 in which a quantity of nickel comprised between 1.2 and 3% by weight relative to the total mass of the zeolite is deposited on said dealuminated zeolite.

7. Preparation process according to claim 1 having a content of metal of group VIB, in percentage of oxide of the element, between 5 and 40% by weight relative to the total mass of said catalyst and the content of non-precious metal of group VIII, in percentage of oxide of the element, between 0.5 and 10% by weight relative to the total mass of said catalyst, the content of element nickel deposited on the dealuminated USY zeolite not being comprised in content of non-precious metal of group VIII.

8. Process for hydrocracking and/or hydrotreatment of hydrocarbon feeds utilizing a catalyst prepared according to the preparation process according to claim 1 in which said catalyst is in the sulphide form.

9. Process for hydrocracking and/or hydrotreatment according to claim 8 in which said process takes place at a temperature above 200° C., under a pressure greater than 1 MPa, at a space velocity comprised between 0.1 and 20 h-1 and with a quantity of hydrogen introduced such that the litre of hydrogen/litre of hydrocarbon volume ratio is comprised between 80 and 5000 L/L.

10. Process for hydrocracking and/or hydrotreatment according to claim 8 in which said hydrocarbon feeds contain at least 20% by volume compounds boiling above 340° C.

11. Process for hydrocracking and/or hydrotreatment according to claim 8 in which said process is implemented in a so-called single-stage process.

12. Process for hydrocracking and/or hydrotreatment according to claim 11 in which said catalyst is utilized in a hydrocracking zone placed downstream of a hydrorefining zone, no intermediate separation being implemented between the two zones.

13. Process for hydrocracking and/or hydrotreatment according to claim 8 in which said process is implemented in a so-called two-stage process.

14. Process for hydrocracking and/or hydrotreatment according to claim 13 in which said catalyst is utilized in the second hydrocracking stage placed downstream of the first hydrorefining stage, an intermediate separation being implemented between the two zones.

* * * * *